United States Patent [19]

Hayami et al.

[11] Patent Number: 5,076,825
[45] Date of Patent: * Dec. 31, 1991

[54] METHOD OF PRODUCING OPTICAL MULTIPLE FIBER

[75] Inventors: Hiroyuki Hayami, Itami; Atsushi Utsumi, Kawanishi, both of Japan

[73] Assignee: Dainichi-Nippon Cables, Ltd., Amagasaki, Japan

[*] Notice: The portion of the term of this patent subsequent to Jun. 5, 2001 has been disclaimed.

[21] Appl. No.: 609,138

[22] Filed: Nov. 6, 1990

Related U.S. Application Data

[63] Continuation of Ser. No. 222,374, Jul. 20, 1988, abandoned, which is a continuation of Ser. No. 842,752, Mar. 21, 1986, abandoned, which is a continuation of Ser. No. 556,233, filed as PCT/JP83/00058, Feb. 26, 1983, abandoned.

[30] Foreign Application Priority Data

Mar. 1, 1982 [JP] Japan .................................. 57-32560

[51] Int. Cl.⁵ .............................................. C03B 23/20
[52] U.S. Cl. ........................................ 65/4.21; 65/3.2; 65/3.11; 385/115
[58] Field of Search ............... 65/3.1, 3.11, 3.2, 4.1, 65/4.2, 4.21; 350/96.24

[56] References Cited

U.S. PATENT DOCUMENTS

| | | | |
|---|---|---|---|
| 2,992,516 | 7/1961 | Norton | 65/3.11 |
| 3,190,735 | 6/1965 | Kapany | 65/4.2 |
| 3,222,520 | 12/1965 | McNaney | 250/71.5 |
| 3,253,500 | 5/1966 | Hicks | 88/1 |
| 3,253,896 | 5/1966 | Woodcock et al. | 65/3.11 |
| 3,414,837 | 12/1968 | Snitzer | 350/96.24 |
| 3,436,142 | 4/1969 | Siegmund et al. | 65/3.11 |
| 3,502,455 | 3/1970 | Gardner | 65/4.21 |
| 3,554,720 | 1/1971 | Crepet | 65/4.21 |
| 3,574,582 | 4/1971 | Siegmund et al. | 65/3.11 |
| 3,582,297 | 6/1971 | Lakeman | 65/4 |
| 3,732,425 | 5/1973 | Ellert et al. | 350/96.24 |
| 3,950,073 | 4/1976 | Horiguchi et al. | 350/96 |
| 3,963,468 | 6/1976 | Jaeger et al. | 65/3.11 |
| 4,011,007 | 3/1977 | Phaneuf et al. | 350/96 |
| 4,161,505 | 7/1979 | Shiraishi et al. | 264/171 |
| 4,360,372 | 1/1982 | Maciejko | 65/4.21 |
| 4,385,092 | 3/1983 | Singer, Jr. | 65/4.3 |
| 4,389,089 | 6/1983 | Strack | 65/4.21 |
| 4,452,623 | 6/1984 | Utsuml et al. | 65/4.21 |
| 4,613,205 | 9/1986 | Seiji et al. | 350/96.25 |
| 4,615,583 | 10/1986 | Tsuno et al. | 350/96.33 |

FOREIGN PATENT DOCUMENTS

| | | |
|---|---|---|
| 984192 | 2/1976 | Canada . |
| 0084216 | 7/1983 | European Pat. Off. . |
| 1535370 | 9/1967 | France . |
| 2277782 | 2/1976 | France . |
| 2269725 | 12/1976 | France . |
| 2417478 | 9/1979 | France . |
| 2436405 | 4/1980 | France . |
| 49-106836 | 10/1974 | Japan . |
| 50-32811 | 10/1975 | Japan . |
| 53-94944 | 8/1978 | Japan . |
| 54-112218 | 9/1979 | Japan . |
| 56-05512 | 1/1981 | Japan . |
| 56-78808 | 6/1981 | Japan . |
| 57-73703 | 5/1982 | Japan . |
| 2033889A | 5/1980 | United Kingdom . |

OTHER PUBLICATIONS

Patents Abstracts of Japan, vol. 5, No. 142 (P-79)(814), Sep. 8, 1981.
Patents Abstracts of Japan, vol. 6, No. 156 (P-135)(1034), Aug. 17, 1982.
A. Ito and A. Utsumi, "Present Stage and Trend of Development of Silica Optical Image Guides", *KEISO*, vol. 24, No. 12, p. 44 (1981) (in Japanese).
T. Morokuma, "ENDOSCOPY", Handbook of Fiber Optics, Gorland STPM Press (1979) pp. 429 to 464.
"Low-Loss Single-Material Fibers Made from Pure Fused Silica", Kaiser et al, *Bell Tech. Jour.*, vol. 53, No. 6, Aug. 1974, pp. 1021-1039.
"Modified Rod-in-Tube Method for Low Loss Step-Index Optical Fiber", Utsumi et al, *Topical Meeting on Optical Fiber Transmission*, Washington, D.C., Mar. 1979.
"Fiber Optics in Adverse Environments II", Utsumi et al, *SPIE*, 506 (1984), 176-183.
"Silica Glass Imageguides and Their Applications", Shintani et al, *JARECT*, vol. 17, Optical Devices & Fibers (1985), 320-332.
"Diaguide Scope, A New Industrial Fiberscope for Upto 100 M Span", Dainichi-Nippon Cables, Ltd., Dec., 1982.
Patent Abstracts of Japan, vol. 5, No. 142 (P-79) (814), Sep., 1981.

(List continued on next page.)

*Primary Examiner*—Richard V. Fisher
*Assistant Examiner*—John J. Bruckner
*Attorney, Agent, or Firm*—Armstrong, Nikaido, Marmelstein, Kubovcik & Murray

[57] ABSTRACT

A method for producing an optical multiple fiber unit wherein a multiplicity of optical fibers are fused together with each other and each optical fiber has a core made of pure silica glass and a cladding layer made of silica glass containing a dopant and disposed on the core, by bundling a multiplicity of preforms corresponding to the optical fibers and drawing the bundle at a high temperature using the optical fiber preforms, preforms having a three-layer construction wherein a support layer made of a silica glass having a drawable temperture of at least 1,800° C. is further disposed on the cladding layer, and drawing the bundle of the preforms to give a multiple fiber wherein the support layer of each optical fiber has a thickness of 0.01 to 1 μm, in order to produce a multiple fiber in which the cladding layer of each optical fiber has a sufficient thickness to fulfill the function as a cladding layer and which has an excellent image-transmitting capacity.

7 Claims, No Drawings

OTHER PUBLICATIONS

K. I. Blokh: "Opticheskie Volokna and Volokonnye Elementry", M. Khimiya, 1972. p. 98.

T. Morokuma, "ENDOSCOPY", Handbook of Fiber Optics, Gorland STPM Press (1979) pp. 429–494, which is a reference cited in the above-mentioned *JARECT*, vol. 17, Optical Devices and Fibers (1984), 320–332.

M. G. Cherniaka: "Nepreryvnoe Stekliannoe Volokno", Khima, M., 1965, pp. 62 to 63 (with English Abstract).

V. B. Veinberg and D. K. Sattarov: "Optika Svetovodov", L. Mashinostroeniya, 1977, pp. 174 to 177, 214 to 215, 278 to 279.

Handbook of Fiber Optics, Theory and Applications (1979), Garland by wolf, pp. 490 to 493.

METHOD OF PRODUCING OPTICAL MULTIPLE FIBER

This application is a continuation of application Ser. No. 222,374 filed July 20, 1988, now abandoned, which is a continuation of application Ser. No. 842,752, filed Mar. 21, 19086, now abandoned, which in turn is a continuation of application Ser. No. 556,233, filed as PCT/JP83/00058, Feb. 26, 1983, now abandoned.

DESCRIPTION

1. Technical Field

The present invention relates to a method for producing an optical multiple fiber (hereinafter simply referred to as "multiple fiber") having a construction that a multiplicity of silica glass optical fibers are fused together with each other. and more particularly to a method for producing a multiple fiber, each optical fiber of which consists of a core of pure silica glass and a cladding layer thereon made of a silica glass containing a dopant and having a lower refractive index than pure silica glass.

2. Background Art

The above-mentioned multiple fiber unit which consists of optical fibers each having a core of pure silica glass retains desirable properties such as excellent heat resistance and radiation resistance inherent in pure silica glass, and therefore is useful as an image-guide for monitoring the inside of a high temperature furnace, a nuclear reactor, and the like.

There is a phenomenon that addition of a dopant to pure silica glass results in a sharp decrease of softening or deformation point. That is. whereas the softening or deformation point of pure silica glass is as high as at least about 1,800° C. that of a silica glass containing a sufficient amount of a dopant to serve as a cladding layer is not more than 1,500° C. or in some cases, not more than 1,000° C., though it varies depending on the kind and amount of the dopant. Moreover. there also is a large difference in deformation resistance in softened state between pure silica glass and a dopant-containing silica glass. The dopant-containing silica glass has a very low deformation resistance as compared with pure silica glass. Generally, a multiple fiber of silica glass is produced by bundling a multiplicity of optical fiber preforms or materials obtained by drawing the preform to reduce it in diameter (hereinafter, those two materials are generically referred to as "preform" simply) and drawing the resulting bundle at a high temperature. When the core of each preform is made of pure silica glass and the cladding layer thereon is made of a silica glass containing a dopant. the cladding layer begins to be fluidized and deformed before the core is softened and deformed in the drawing step. and the cladding material tends to separate from the core and flow into portions of low flow resistance, which results in the formation of a defective multiple fiber wherein the cores of some adjacent optical fibers are brought abnormally near to each other or into direct contact with each other in some places. This problem is apt to occur when the average thickness of cladding layers, after drawing, is small. Such a multiple fiber, of course, is deficient in image-transmitting capacity.

It is an object of the present invention to provide a method for producing a multiple fiber having an excellent image-transmitting capacity in which the cladding layer of each optical fiber has a sufficient thickness to fulfill the function as a cladding layer.

DISCLOSURE OF THE INVENTION

The present invention provides a method for producing a multiple fiber wherein a multiplicity of optical fibers are fused together with each other and each optical fiber comprises a core made of pure silica glass and a cladding layer made of a silica glass containing a dopant and disposed on the core, by bundling a multiplicity of preforms corresponding to the optical fibers and drawing the bundle at a high temperature. the method being characterized in that preforms having a three-layer construction wherein a support layer made of a silica glass having a drawable temperature of at least 1,800° C. is further disposed on the cladding layer ar used as said optical fiber preforms, and the bundle of the preforms is drawn to give a multiple fiber wherein the 0.01 to 1 μm.

In the foregoing. the drawable temperature of the support layer means the temperature of the material being subjected to drawing in case of drawing it by a conventional method. More particularly, it is defined as follows: A pipe made of the same material as that of the support layer and having an inner diameter of 23 mm. and an outer diameter of 26 mm. is drawn to reduce the pipe in diameter, giving a pipe having an inner diameter of 2.3 mm. and an outer diameter of 2.6 mm. The drawable temperature means the lowest temperature that permits to take up the pipe of the reduced diameter at a rate of 0.5 m./min. with a drawing tension of not more than 500 g.

In the present invention. the multiple fiber is produced by bundling a multiplicity of preforms having the three-layer construction corresponding to optical fibers having the three-layer construction and drawing the bundle. Since the above-mentioned support layer of high-softening silica glass is located on the outside of the cladding layer of each preform. an excessive fluidization of the cladding layer is prevented during drawing to thereby eliminate the problem that the cores of some adjacent optical fibers come into direct contact with each other.

The silica glass as the constituent material of the support layer may be any of natural silica glasses and synthetic silica glasses. only if its drawable temperature is at least 1,800° C. Preferably, the support layer is a silica glass having a drawable temperature of at least 1,850° C., particularly at least 1,900° C. Such a high-softening silica glass has a deformation resistance in softened state which is comparable to that of pure silica glass.

If the support layer of each optical fiber is too small in thickness, it does not provide a sufficient property to prevent the excessive fluidization of the cladding layer. Therefore, in terms of "the thickness of the support layer" as defined hereinafter. it is preferable that the support layer has a thickness of at least 0.01 μm., especially at least 0.1 μm.

On the other hand, the research undertaken by the present inventors has shown that the light incident on the support layers of the respective optical fibers included in a multiple fiber during the transmission of an image with the multiple fiber exerts the bad influence of blurring the transmitted image, that is to say, the support layer functions as a path of stray light. The degree of such bad influence is much higher with an increasing thickness of the support layer. Therefore, it is preferable that the thickness of the support layer of each optical fiber is not more than 1 μm., particularly not more than 0.5 μm. By ensuring such a small thickness for the support layer of each optical fiber. the degree of the bad influence that the support layer functions as the stray light path can be reduced. Definition of the thickness of the support layer: In most of the optical fibers in a multiple fiber produced by bundling and drawing a multiplicity of preforms having the three-layer construction, the cladding layer and the support layer are deformed so that their outer shapes are hexagonal in cross section, with the support layers of adjacent optical fibers being fused together with each other. Therefore, the thickness of the support layer for each optical fiber is defined to be one-half of the width of the support layers present along each side of the above-mentioned hexagon (in other words, the width of the support layers means the thickness of the layer which is formed by fusion of two support layers with each other with respect to two adjacent optical fibers).

The multiple fiber wherein each support layer of the optical fibers contained therein has the above-mentioned thickness can be easily produced by taking into consideration the thickness of the support layer of optical fiber preforms used and the drawing ratio. The drawing temperature is usually rom 1,800° to 2,200° C., preferably from 1,900° to 2,100° C. The outer diameter of each optical fiber included in the final multiple fiber (the outer diameter means the distance between the two diametrically opposite sides of the support layer having the above-mentioned hexagonal outer shape) is usually from 10 to 50 μm.

The effect of providing the support layer is especially pronounced when the multiple fiber unit produced by the method of the present invention has an outer diameter of 0.5 to 3 mm. (when the skin layer described hereinafter is present, the outer diameter including the skin layer) and contains 1.000 to 30,000 optical fibers.

In the practice of the present invention, a bundle of preforms may be directly drawn but it is more advantageous to insert preforms into a silica glass tube made of synthetic or natural silica glass in an orderly arrangement and draw the bundle of the preforms together with the silica glass tube, the latter method ensuring the production of a multiple fiber having a more uniform outer diameter. In this case. the resulting multiple fiber has a silica glass skin layer derived from the silica glass tube as an outermost layer.

BEST MODE FOR CARRYING OUT THE INVENTION

The method of the present invention is explained in more detail by means of the following Examples and Comparative Example.

EXAMPLES 1 ANd 2 AND COMPARATIVE EXAMPLE 8,000 three-layer preforms having clean surfaces and each consisting of a core made of pure silica glass and having an outer diameter of 300 μm., a cladding layer disposed on the core and made of a silica glass doped with $B_2O_3$ and having a thickness of 70 μm., and a support layer disposed on the cladding layer and made of a natural silica (drawable temperature: 1,900° C.) and having a thickness of 15 μm. were bundled and encased in a silica glass pipe. While the silica glass pipe was evacuated from the upper end thereof, the pipe was heated at the lower end at a temperature of 2,000° C. and drawn from the lower end to give a multiple fiber made up of 8,000 optical fibers each having a support layer of about 0.4 μm. in thickness (Example 1). Microscopic examination of the end surface of the obtained multiple fiber revealed no direct contact between the cores of the optical fibers.

A multiple fiber wherein the support layer of each optical fiber had a thickness of 0.1 μm. (Example 2) and another multiple fiber wherein the support layer of each optical fiber had a thickness of 2 μm. (Comparative Example) were also produced by changing only the drawing ratio in the procedures of Example 1. While none of the multiple fibers of Examples 1 and 2 and of Comparative Example showed a direct contact between the cores of the optical fibers, the multiple fibers of Examples 1 and 2 were superior to that of Comparative Example in the sharpness of transmitted image when used as image-guides due to the thinness of the support layers.

We claim:

1. A method for producing an optical multiple fiber unit from a multiplicity of optical fibers sufficient in number for transmitting an image, the steps comprising:

providing a plurality of optical fibers, each optical fiber having a circular core of pure silica having a drawable temperature of not less than 1800° C., a cladding layer of a silica glass containing a dopant disposed around said core and a support layer surrounding said core and said cladding layer, said support layer being of silica glass and having a drawable temperature not substantially less than the drawable temperature of said pure silica glass of said core but substantially higher than the drawable temperature of said silica glass of said cladding layer containing said dopant;

bundling said plurality of optical fibers into a bundle of contiguous optical fibers with the axis of said bundled optical fibers in substantial parallel alignment with the axis of the optical multple fiber to be produced;

heating said bundled optical fibers to such a heating temperature that said bundle is drawable;

while maintaining said bundled circular fibers in support layer contact and so heating said bundle, drawing said bundled fibers at said heating temperature wherein said heating temperature is not less than 1800° C., and not more than 2200° C. to thereby heat-adhere the contacting surfaces of said support layers against each other to form surfaces which together form a substantially hexagon which surrounds each of said cladding layes; and, while so drawing said bundled fibers, adjusting the drawing ratio of said fibers so that the thickness of said support layer on each of said fibers in said drawn bundle is drawn to a thickness not substantially less than 0.01 μm and not substantially greater than 1 μm.

2. A method for producing an optical multiple fiber unit, as recited in claim 1, in which said temperature is not less than 1850° C.

3. A method for producing an optical multiple fiber unit, as recited in claim 1 or 2 in which said thickness of said support layer on said fibers in said drwan bundle is drawn to a thickness of at least 0.1 μm and not more than 0.5 μm.

4. A method for producing an optical multiple fiber unit, as recited in claim 3, in which each of said optical multiple fibers in said bundle has an outer diameter not less than 0.5 mm and not more than 3 mm and contains 1,000 to 30,000 optical fibers.

5. A method for producing an optical fiber unit, as recited in claim 4 in which said fiber bundle is inserted into a preformed tube of silica glass and drawn in said tube to form a silica skin layer around said drawn optical fibers.

6. A method for producing an optical fiber unit, as recited in any one of claims 1 or 2 in which said fiber bundle is inserted into a preformed tube of silica glass and drawn in said tube to form a silica skin layer around said drawn optical fibers.

7. A method for producing an optical multiple fiber unit from a multiplicity of optical fibers sufficient in number for transmitting an image, the steps comprising:
　providing a plurality of optical fibers, each optical fiber having a circular core of pure silica having a drawable temperature of not less than 1800° C., a cladding layer of a silica glass doped with $B_2O_3$ disposed around said core and a support layer surrounding said core and said doped cladding layer, said support layer being of silica glass and having a drawable temperature not less than the drawable temperature of said pure silica glass of said core but higher than the drawable temperature of said doped silica glass of said cladding layer;
　bundling said plurality of optical fibers into a bundle of contiguous optical fibers with the axis of said bundled optical fibers in substantial parallel alignment with the axis of the optical multiple fiber unit to be produced;
　heating said bundled optical fibers to such a heating temperature heat said bundle is drawable;
　while maintaining said bundle fibers in support laye contact and so heating said bundle, drawing said bundled fibers at said heating temperature wherein said heating temperature is not less than 1800° C., and not more than 2200° C., to thereby heat-adhere the contactign surfaces of said support layers against each other to form surfaces which together form a substantially hexagon which surrounds each of said cladding layers; and,
　while so drawing said bundled fibers, adjusting the drawing ration of said fibers so that the thickness of said support layer on each of said fibers in said drawn bundle is drawn down to a thickness of at least 0.01 $\mu$m and not more than 1 $\mu$m.

* * * * *